Figure 4:
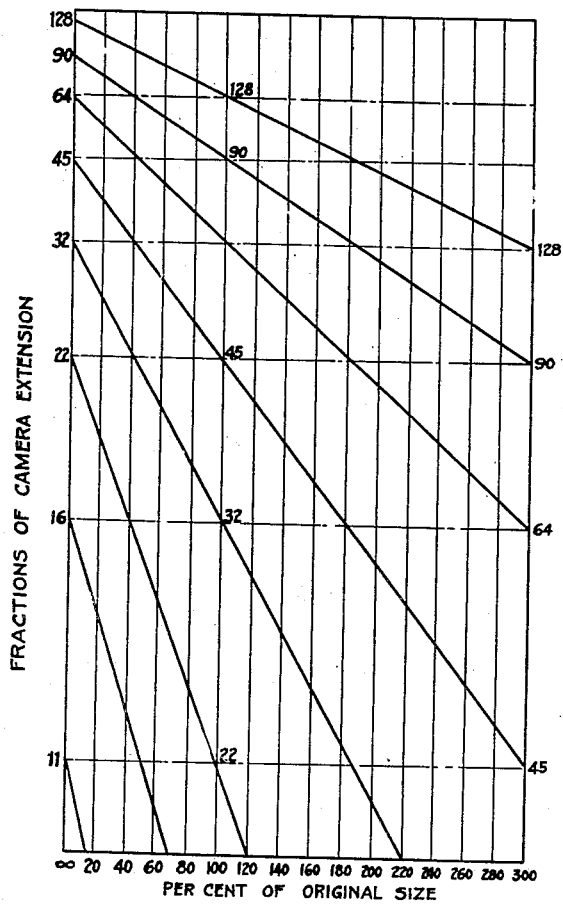

July 26, 1938.  A. MURRAY  2,124,889
PROCESS LENS MOUNT
Filed April 29, 1936  2 Sheets-Sheet 1
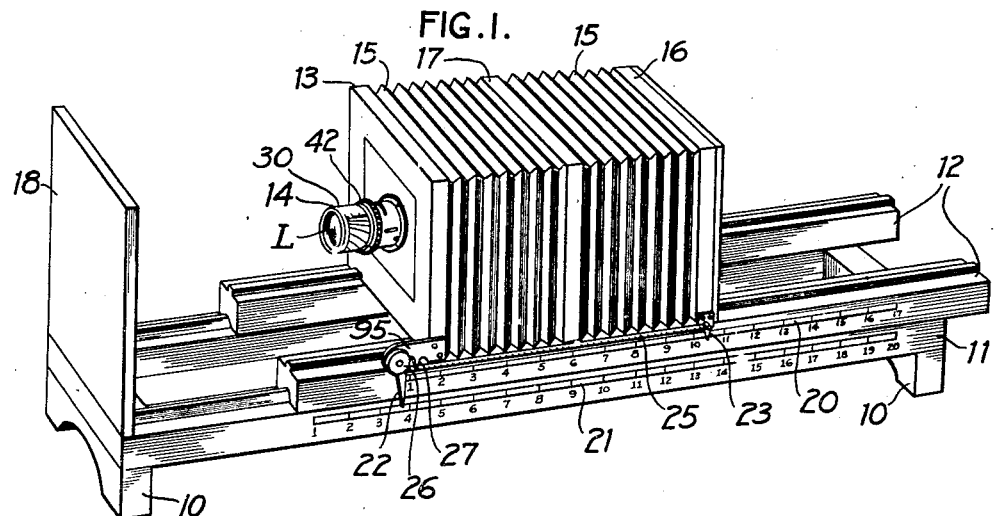
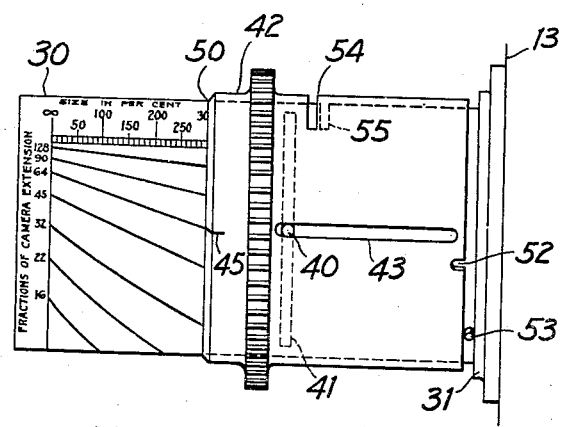
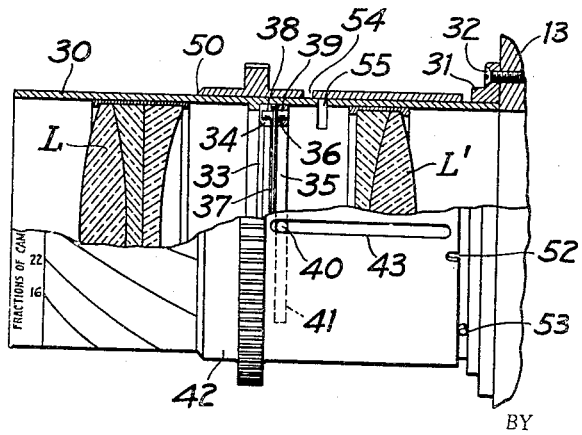
INVENTOR.
Alexander Murray
BY
ATTORNEYS July 26, 1938.  A. MURRAY  2,124,889
PROCESS LENS MOUNT
Filed April 29, 1936   2 Sheets-Sheet 2

INVENTOR.
Alexander Murray
BY
ATTORNEYS

Patented July 26, 1938

2,124,889

UNITED STATES PATENT OFFICE 2,124,889

PROCESS LENS MOUNT

Alexander Murray, Rochester, N. Y., assignor, by mesne assignments, to Eastman Kodak Company, Jersey City, N. J., a corporation of New Jersey Application April 29, 1936, Serial No. 76,949

10 Claims. (Cl. 95—64)

This invention relates to photography and particularly to a method of graduating process lenses, with certain alterations in the lens mount, so that half-tone work can be done by the photographer without calculations, reference tables, or installation of accessory equipment.

The factors entering into half-tone negative making can be classed under two heads; camera factors and other factors. Under camera factors are screen openings, screen separations, bellows extension, and lens opening. The other factors are temperature, light, strength, developing time, etc.

For any given job there is a certain minimum of facts that a half-tone photographer must know about an exposure. These are: size of reproduction, ratio of screen distance to screen opening, and "stop" setting for selected ratio of "stop" to camera extension. Of the above, the size of reproduction changes for each change of size, the ratio of screen distance to screen opening does not change, and the "stop" setting for selected ratio of "stop" to camera extension also varies with each change of size. The following formula can be used to calculate diaphragm openings for any job: the screen opening × camera extension + screen distance = lens opening or "stop." Therefore, if the ratio of screen distance to the screen opening does not change with each camera setting there is a change of two variables, size of reproduction (camera extension) and "stop" setting (lens opening). It will readily be seen that getting the correct detail "stop" for every exposure, enlargement or reduction, is a complex problem; and a device which will automatically solve this problem is a valuable addition to every process lens.

When a copy is received for reproduction, the size desired should be marked thereon in percent of the original. The photographer should then be able to set his lens scale to that percent, and then set the diaphragm to the desired fraction of camera extension, such as 1/64 or 1/90, these two series of numbers on the lens thus eliminating all calculation as to the size of the diaphragm opening required.

All process lenses are graduated in the "f" system, that is, they are marked with "f" values which only read correctly when the lens is at infinity. Process photographers do not use lenses at infinity since their work is seldom far from same size as the copy. Several apparatus and "systems" have been devised to save the photographer the trouble of calculating the "stop" diameters from his camera extension, and then translating them into "f" values. But said apparatus and "system" are expensive and so complicated as to be unwieldy; and mainly owe their existence to the fact that lens manufacturers persist in marketing process lenses with a scale that has nothing to do with process work.

Therefore, one object of my invention is to provide a process lens so calibrated that calculations into the "f" values are unnecessary. Another object is to provide a process lens which is so calibrated that the diaphragm openings for any size reproduction can be directly set by the diaphragm operating ring without relying on any additional scale reading. Still another object is to provide an adjustable direct reading process lens wherein the diaphragm for any size reproduction can be easily and accurately set without the use of cumbersome scales. And another object is to provide a process lens of the type described wherein the calibrated scales are integral with the lens mount and require no accessory equipment. Another object of this invention is to provide a process lens which is so graduated that half-tone work can be done without calculations by the photographer, reference to tables, or installation of accessory equipment.

Briefly, my invention consists of a process lens on the barrel of which is etched a system of graphs calibrating percent of reproduction and diaphragm openings based on camera extension. A diaphragm operating ring is slidably mounted on the lens barrel so that it can be moved axially of the lens barrel to intersect given percentages of reproduction and also is adapted to rotate on the lens barrel to intersect the lines referring to given diaphragm openings and the different percentages of reproduction. The rotation of the diaphragm operating ring controls the opening and closing of the diaphragm leaves.

Figure 5:
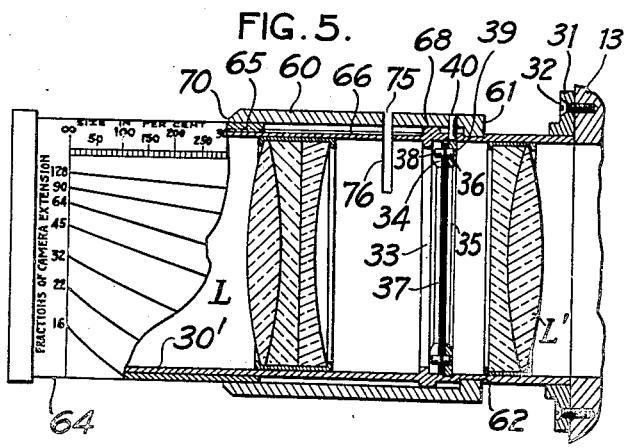

The novel features that I consider characteristic of my invention are set forth with particularity in the appended claims. The invention itself, however, both as to its organization and its method of operation, together with additional objects and advantages thereof, will best be understood from the following description of the specific embodiments when read in connection with the accompanying drawings, in which, Fig. 1 is a perspective of any suitable process camera shown equipped with my novel process lens, Fig. 2 is a side elevation showing a preferred embodiment of novel process lens, Fig. 3 is a partial section of Fig. 2 showing the operation of the diaphragm leaves, Fig. 4 is a graph showing the method used in laying out the scale used on my novel process lens, and Fig. 5 is a side view, partly in section and partly in elevation, showing a modified form of my novel process lens.

Like reference characters refer to corresponding parts in the several figures.

Referring now to Fig. 1, wherein an ordinary process camera is shown mounted on a suitable support, there is shown at 10 a bed or support provided with track 11 on which is slidable a camera carrier 12. On the camera carrier 12 a camera is slidably mounted comprising a lens board 13, on which is mounted a process lens 14, which shows a preferred embodiment of my invention, a bellows part 15 and a plate carrier 16. A support member 17 is interposed in the bellows part 15 to act merely as a support therefor. The lens board 13 is stationary relative to the camera carrier 12; but the plate carrier 16 is adapted to be movable toward and away from the lens board 13 by the contraction and expansion of the bellows 15.

In use, the camera carrier 12 is moved to the desired position on track 11 so that the lens board 13 is at a proper distance from the copy that is to be reproduced, said copy being properly positioned on the copy board 18. The distance that the lens board 13 is spaced from the copy board 18 varies with the size of reproduction of the copy that is desired. The plate holder 16 is moved toward or away from the lens board for the purpose of focusing. The relative position of the lens board 13 to the copy board 18, and the plate carrier 16 to the lens board for any given size of reproduction, can be found by the operator by measuring the image of the copy formed on the ground glass of the camera, or the individual operator can scale his camera in any suitable way, as shown by the scales 20 and 21. Scale 21 is fixed to the side of the track 11, and is marked off with any set of empirical calibrations. The pointer 22 fixed to the lens board 13 is adapted to cooperate with said scale 21 so that after an operator has scaled his camera and finds that for a 2 to 1 enlargement the lens board should be at 4 on scale 21, the carrier 12 can be moved until the pointer 22 indicates the No. 4 on scale 21.

Then for each position of the lens board for any given size reproduction the plate carrier 16 must have a definite position relative to said lens board so that the image will be in proper focus. For this purpose scale 20 is fixed to the side of the camera carrier 12 said scale also being empirically calibrated the same as scale 21. Another pointer 23 is fixed to the plate carrier 16 to cooperate with scale 20 so that the position of the plate carrier relative to the position of the lens board can be easily set. For example, if an operator after scaling his camera has found that in marking a 2 to 1 enlargement, referred to above and for which the lens board was positioned at 4 on scale 21, that the plate carrier 16 should be at 9½ on scale 20, then this relationship of the two scale members will always give a 2 to 1 enlargement. Sets of scale numbers for any size reproduction can be found by the individual operator for his camera in this manner, and the procedure of setting a camera for any given size reproduction can thus be greatly simplified. If scales 20 and 21 are marked off in inches, the camera extension for any size reproduction can be read directly on scale 20 by noting the distance between the pointers 22 and 23, or if the scales are entirely empirical, the camera extension can be made in the usual way by means of a tape, 25, one end of which is fixed to the plate carrier 16 while the retractable casing 26 therefor is fixed to the lens board 13 by means of a suitable bracket 95, the reading being taken under the pointer 27 which is fixed to bracket 95.

The process camera and carrier therefor, which have been described above, is old in the art and forms no part of my invention, the showing and description thereof being brought out merely to aid in the disclosure of my novel process lens which is adapted for use on any process camera. Referring now to Figures 2 and 3, wherein a preferred embodiment of my process lens is shown, 30 is a lens barrel in which are placed two sets of lenses L and L'. The end of the lens barrel 30 is provided with a mounting ring 31 through which screws 32 extend into the lens board 13 for holding the lens in correct position thereon.

Between the sets of lenses L and L' is positioned an iris diaphragm of the customary type comprising a stationary ring 33 which is provided around its face with a plurality of spaced radial slots 34, and a rotating ring 35 which is provided with a plurality of recesses 36. Each diaphragm leaf 37 has a pair of pins 38 and 39 fixed thereto; pin 38 being fixed to one end and extending from one side of the leaf, while pin 39 is fixed to the other end of the leaf and extends from the opposite side thereof. When a leaf is mounted between the rings 33 and 35, pin 38 thereon extends into one of the slots 34 in the stationary ring 33 while the other pin 39 on the same leaf is adapted to extend into one of the recesses 36 of the rotating ring so that when the rotating ring 35 is rotated with respect to the stationary ring 33 the diaphragm leaves are adapted to close or open the diaphragm opening depending upon the direction of rotation. Pin 40 fixed to the rotating diaphragm ring 35 is adapted to extend radially through a circumferential slot 41 in the lens barrel so that the diaphragm may be operated from the outside of said lens barrel.

The diaphragm operating ring 42 is slidably and rotatably mounted on the circumference of the lens barrel, and is provided with an elongated slot 43 which is adapted to engage pin 40 and control the opening and closing of the diaphragm when the ring 42 is rotated; and at the same time to allow the diaphragm operating ring to slide axially of the lens barrel without actuating the diaphragm.

In order to adapt this process lens to give a quick and accurate diaphragm setting corresponding to any size of reproduction of a copy without necessitating accessory equipment or calibration into the "f" system, I etch a specially calculated system of curves on the forward end of the lens barrel with which an index mark 45 on the diaphragm operating ring 42 is adapted to cooperate to give correct diaphragm setting corresponding to given sizes of reproduction and given fractions of camera extensions.

The following is a complete description of the derivation and making of this new lens scale as used on my novel process lens. The "f" values marked on any lens barrel read directly as fractions of camera extension only when the lens is focused at infinity. For example, at infinity a diaphragm set at "f-64" will have an aperture whose diameter is 1/64 of the camera extension. At infinity a photographic image may be taken as approximately 0.0% of the size of the original. Hence, on a scale giving the percent size of reproduction, "f" values are numerically correct as they stand at 0% and they give actual values of camera extensions.

As percent reproduction of size increases, the camera extension increases, until at "same size" or 100% size, the camera extension is twice as great as it was at infinity. In other words, in going from 0.0% to 100% size, the camera extension is doubled. Then, in order to maintain the same angular aperture, the diameter of the diaphragm opening must be increased proportionately to the increase in camera extension. So, at 100% (or same size), the diameter of the aperture must be twice as great as at 0.0% (or infinity). For example, on an ordinary 18 inch lens at 0.0%, the diameter of an aperture 1/64 camera extension is 18/64 of an inch, and this aperture is marked "f-32" on the lens barrel. At 100%, the camera extension is 36 inches, and a 1/64 aperture is 36/64 of an inch, but this aperture is marked "f-32" on the lens barrel. At 300% size, or an enlargement of three diameters, the camera extension is four times that at infinity or 72 inches for an 18 inch lens. A 1/64 aperture will then be 72/64 inch, and correspond to "f-16" marked on an ordinary lens barrel.

On my new lens, the calibrations at 0.0% correspond to "f" numbers. In laying out the new scale, the first step is to measure the distance in millimeters around the circumference of the diaphragm ring between marks corresponding to "f" value diaphragm settings. These distances are laid out on a graph, see Figure 4 where an 18 inch lens is figured, on which the ordinates are millimeters and the abscissae are percents of original size. Thus, along the 0.0% line we have points corresponding to the "f" values, giving actual fractions of that particular camera extension whose linear separations on the diaphragm ring could be read from the ordinates in millimeters. These points are marked 90, 64, 45, 22, and 16.

Now, as explained earlier, at 100%, the same marks correspond to apertures that are only half their former values as to camera extension. Accordingly, on the 100% line in the graph, points are located corresponding to the same ordinates as the first set, but these are given twice the original numerical value. For example, 16 becomes 32 because it is now only 1/32 of the camera extension; 22 becomes 45, etc. Points are marked off corresponding to the same ordinates, on the 300% line, and these are given four times their original value. For example, 16 at 0.0 line becomes 64 at the 300% line, 32 becomes 128, etc. Straight lines are next drawn through identical numbers, and the result is a series of straight sloping lines subtending various angles with the base line. A pen drawing of the scale is then made, taking the measurements from the graph and the scale is etched on the lens barrel in any suitable manner. It is to be understood that the dimension of this scale is suitably calculated for the size of the lens barrel on which it is to be etched.

Now, referring back to Figure 2, the lens barrel 30 is shown provided with a series of curves derived in the above described manner. The vertical scale gives fractions of camera extension while the horizontal scale gives sizes of reproduction in percent. In the scale shown on the lens, 100% equals same size, and the percents to the right or left thereof refer to corresponding enlargements or reductions according to their values. By way of example, suppose an operator has a copy requiring a 2 to 1 enlargement. After the lens board 13 and plate carrier 16 on the camera have been properly positioned, the problem of setting the "stop" or diaphragm aperture for that particular enlargement confronts him.

If he feels that 1/90 of the camera extension is the satisfactory size "stop" to take, he first slides the diaphragm operating ring 42 longitudinally of the lens barrel 30 until the vertical edge 50 thereof, which is milled to an accurate finish, lines up with the 200% line on the horizontal scale of the graph on the lens barrel. He then rotates the diaphragm ring 42 until the index 45, on the vertical edge 50 thereof, intersects the curve marked 90, which is 1/90 of the camera extension, and the diaphragm is then correctly set for his exposure. In Figure 2, the diaphragm ring as set indicates the correct diaphragm opening or stop for a 3 to 1 enlargement at 1/64 of the camera extension.

In order to make a "flash" exposure with my novel process lens, the diaphragm operating ring 42 is slid axially of the lens barrel 30 toward the camera lens board 13 and is rotated until a slot 52 in the rear end thereof receives a pin 53 which is fixed to and extends radially from the lens barrel 30. The diaphragm operating ring is then locked against rotation with the diaphragm wide open, and a suitable circumferential slot 54 therein is aligned with another circumferential slot 55 in the lens barrel 30 so that a desirable "flash" stop of the slide type, i. e., Waterhouse stop, can be inserted into the lens barrel to give the desired "flash" exposure.

Referring now to Figure 5, wherein a modified form of my process lens is shown, the lens barrel 30' is again provided with a mounting ring 31 through which screws 32 extend into the lens board 13 to hold the lens properly positioned on the camera. The diaphragm operating ring 60 is rotatably mounted on the lens barrel, but is fixed against movement axially thereof by virtue of a flange 61 engaging in a recess 62 which extends around the circumference of said lens barrel.

The diaphragm operating ring 60 is split longitudinally thereof, not shown, so that it can be sprung into its assembled position on the lens barrel. An iris diaphragm of the type described above is fixed in the lens barrel and is operably connected to the diaphragm operating ring 60 by virtue of the pin 40, which is fixed to the rotating diaphragm ring, extending through an aperture in said ring 60. A cylinder 64 is slidably mounted on the forward end of the lens mount 30' to telescope with the forwardly extending end of the diaphragm operating ring. This cylinder 64 is provided with a tongue portion 65 which is adapted to engage a longitudinal groove 66 in the lens barrel 30' to allow said cylinder to slide axially of the lens barrel but to prevent its rotation thereupon. The flange 68 on the lens barrel 30' acts as a stop to prevent cylinder 64 from being slid so far rearwardly of the barrel as to contact the diaphragm operating pin 40. In this form of my lens mount the scales as described above, for indicating the correct aperture setting for any size of reproduction, are etched on the circumference of the sliding cylinder 64 which is fitted on the lens barrel 30'. Therefore, in order to set this form of my lens to the correct diaphragm aperture for a given size reproduction, the sliding cylinder 64 is slid axially of the lens barrel 30' until the forward vertical end 70 of the diaphragm operating ring, which is provided with an index point the same as described in connection with the form shown in Figures 2 and 3, cuts the percentage reproduction scale at the required point.

The diaphragm operating ring 60 is then rotated until the index point on the forward end thereof, similar to the one marked 45 in Figure 2, but not shown in Figure 5, intersects the curve of the fraction of camera extension, i. e., 64, 90, etc., which the operator feels will give the satisfactory exposure for the given reproduction, and then the diaphragm opening is correctly set for the selected fraction of camera extension at the required size of reproduction. It is obvious to one skilled in the art, that the sliding cylinder 64 could be provided with any number of different clamping means for holding it in a given adjusted position axially of the lens barrel, or a rack and pinion type of feeding mechanism could be incorporated thereon, but a showing thereof in the drawings has been purposely omitted for the sake of clearness. In order to adapt this modified form of my process lens for "flash" exposures, the diaphragm operating ring 60 and the lens barrel 30' are provided with circumferential slots 75 and 76 respectively which can be brought into alignment as shown in Figure 5, so that a suitable "flash" stop slide, i. e., Waterhouse stop, can be properly inserted into the lens barrel. The slot 75 in the diaphragm operating ring 60 and the slot 76 in the lens barrel 30' are so positioned relative to one another circumferentially that they cannot be brought into alignment for "flash" exposure purposes without insuring a wide open position of the iris diaphragm.

From the foregoing description of my invention, it can be readily understood that my novel process lens offers the photographer a lens which eliminates all calculations of the "stop" diameters from the camera extensions, and then translating them into "f" sizes, in which system all ordinary process lenses are marked.

With my novel lens the correct diaphragm opening or "stop" for any desired fraction of camera extension and size of reproduction is easily and accurately obtained without the use of expensive accessory equipment which would have to be adjusted for use on any individual camera. With my structure, each individual lens and its iris diaphragm is correctly calibrated and scaled so that the lens can be mounted directly on any camera and operated satisfactorily without adjustment.

Although I have shown and described certain specific embodiments of my invention, I am fully aware that many modifications thereof are possible. My invention, therefore, is not to be restricted except in so far as is necessitated by the prior art and by the spirit of the appended claims.

Having thus described my invention, what I declare as new and desire to secure by Letters Patent is:

1. In a process lens mount the combination of a lens tube, an adjustable diaphragm mounted therein, a scale wrapped around the circumference of said lens tube, said scale based on the various diaphragm openings necessary for different focal lengths and different percentages of reproduction, a diaphragm operating ring rotatably and slidably mounted on said lens tube, and connected with the diaphragm for adjusting the same, one end of said ring adapted to overlap said scale and provided with an index for cooperating with said scale.

2. In a process lens mount the combination of a lens tube, an adjustable diaphragm mounted therein, a scale on the circumference of said lens tube based on the various diaphragm openings necessary for different focal lengths and different percentages of reproduction, a diaphragm operating ring rotatably and slidably mounted on said lens tube, and connected with the diaphragm for adjusting the same, one end of said ring adapted to overlap said scale as the ring is slid along the lens tube, said overlapping end of the tube being accurately finished and provided with an index for cooperating with said scale.

3. In a process lens mount the combination of a lens tube, an adjustable diaphragm mounted therein, a diaphragm operating ring rotatably and slidably mounted on said lens tube, and connected with the diaphragm for adjusting the same, an index on the forward end of said ring, a scale around the circumference of said lens tube adapted to be overlapped by said diaphragm operating ring for cooperation with the index thereon, said scale based on the various diaphragm openings necessary for the different focal lengths and different percentages of reproduction, said diaphragm operating ring and said lens tube each provided with a circumferential slot of similar dimensions, a pin fixed to said lens tube, the rear end of said diaphragm operating ring provided with a slot for receiving said pin to prevent rotation of the diaphragm ring and align the circumferential slots of said ring and the lens tube.

4. In a process lens mount the combination of a lens tube having a circumferential slot therein, a diaphragm mounted in said lens tube, a pin fixed to said diaphragm and adapted to extend through the circumferential slot in the lens tube, a diaphragm operating ring rotatably and slidably mounted on said lens tube, and having a longitudinal slot for receiving said pin, an index on the forward end of said diaphragm operating ring, a scale on the circumference of said lens tube adapted to be overlapped by the diaphragm operating ring whereby the forward end of said ring and the index thereon cooperate with the scale, said scale based on the various diaphragm openings necessary for different focal lengths and different percentages of reproduction, and cooperating means on the lens tube and the diaphragm operating ring for adapting the lens mount for "flash" exposures.

5. In a process lens mount the combination of a lens tube, an adjustable diaphragm therein, a diaphragm operating ring rotatably mounted on said lens tube, and connected with the diaphragm for adjusting the same, an index on said ring, a cylindrical member mounted on said lens tube and adapted to slide longitudinally thereof, and a scale on said cylindrical member for cooperating with said index, said scale based on the various diaphragm openings necessary for different focal lengths and different percentages of reproductions.

6. In a process lens mount the combination of a lens tube, an adjustable diaphragm mounted therein, a diaphragm operating ring rotatably mounted on said lens tube, and connected with the diaphragm for adjusting the same, an index on one end of said ring, a cylindrical member mounted on said lens tube to slide longitudinally thereof in telescopic engagement with said diaphragm operating ring, and a scale around the circumference of the cylindrical member cooperating with diaphragm operating ring and the index thereon, said scale based on the various diaphragm openings necessary for the different focal lengths and different percentages of reproductions.

7. In a process lens mount the combination of a lens tube, an adjustable diaphragm mounted therein, a cylindrical member slidably mounted on said lens tube, a scale on the circumference of said cylindrical member based on various diaphragm openings necessary for different focal lengths and different percentages of reproduction, a diaphragm operating ring rotatably mounted on said lens tube, said ring connected with the diaphragm for adjusting the same and having one end in overlapping engagement with said cylindrical member, and an index on the end of said diaphragm operating ring cooperating with said scale.

8. In a process lens mount the combination of a lens tube having a groove in the periphery thereof extending longitudinally of the tube, an adjustable diaphragm in said tube, a cylindrical member telescopically mounted in said tube, a tongue on the inside diameter thereof adapted to fit into the groove in said tube for confining the cylindrical member to sliding engagement with said tube, a scale on the circumference of said cylindrical member based on various diaphragm openings necessary for different focal lengths and different percentages of reproduction, a flange on said lens tube for limiting the sliding movement of said cylindrical member, a diaphragm operating ring rotatably mounted on said lens tube and connected with said diaphragm for adjusting the same, one end of said ring adapted to overlap said cylindrical member and be provided with an index for cooperating with said scale.

9. In a process lens mount the combination of a tubular lens support, an adjustable diaphragm therein, a tubular diaphragm adjusting member connected with the diaphragm for adjusting the same, one tubular member including a scale and the other tubular member including an index, one tubular member being mounted on the other tubular member to permit of longitudinal and rotational movement between the two members whereby the scale and index thereon may cooperate to give the proper diaphragm opening for any given magnification.

10. In a process lens mount. the combination with a lens tube, an adjustable diaphragm mounted therein, means for adjusting the diaphragm including an operating ring, of a magnification diaphragm ratio calculating device comprising two relatively movable parts, one part including a graph graduated into units in two directions over a relatively large area and surrounding the lens tube, the other part including an index carried by the diaphragm adjusting means and adapted to cooperate with said beforementioned graph and move in two directions over the graduated units when said parts are moved relative to each other.

ALEXANDER MURRAY.

CERTIFICATE OF CORRECTION.

Patent No. 2,124,889.                               July 26, 1938.

ALEXANDER MURRAY.

It is hereby certified that error appears in the printed specification of the above numbered patent requiring correction as follows: Page 3, first column, line 24, for ""f-32"" read "f-64"; and that the said Letters Patent should be read with this correction therein that the same may conform to the record of the case in the Patent Office.

Signed and sealed this 4th day of October, A. D. 1938.

Henry Van Arsdale (Seal)                          Acting Commissioner of Patents.